March 11, 1930.　　　　J. L. DISNEY　　　　1,750,163
INSECT TRAP
Filed Nov. 26, 1927
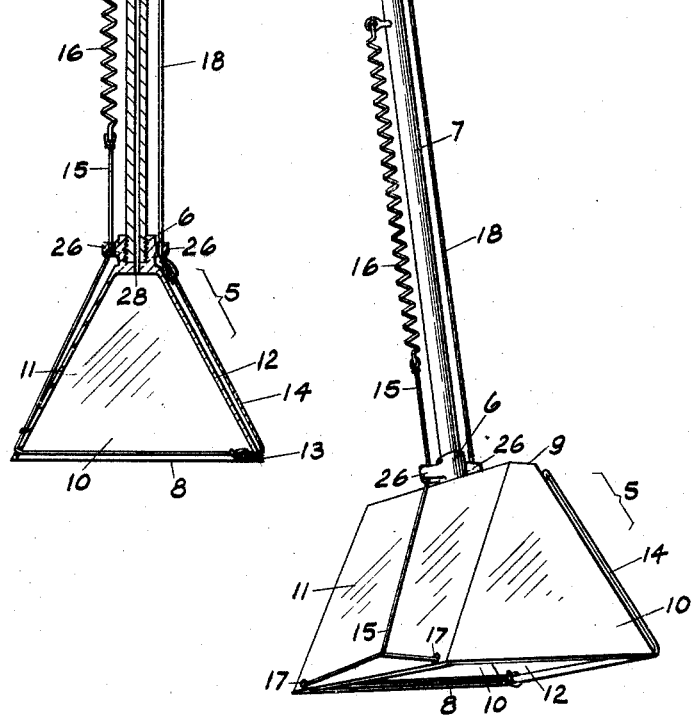
WITNESSES:
INVENTOR:
James Lambert Disney,
BY
ATTORNEY.

Patented Mar. 11, 1930

1,750,163

UNITED STATES PATENT OFFICE

JAMES LAMBERT DISNEY, OF JENKINTOWN, PENNSYLVANIA

INSECT TRAP

Application filed November 26, 1927. Serial No. 235,778.

My invention relates to insect traps and more particularly to devices adapted to trap insects which are resting on relatively flat surfaces.

The common methods of exterminating flies, by killing them with a fly swatter, catching them with sticky fly paper and poisoning them with a liquid placed in the infested area, are objectionable in many respects and are totally inadequate for catching or exterminating other insects such as spiders, moths or scorpions which often invade inhabited buildings.

An object of my invention is to provide a device by means of which almost any insect of appreciable size may be caught and imprisoned therein until released out-of-doors or killed.

When trapping an insect, it may become frightened and escape if it sees the trap approaching and another object of my invention is to provide a trap made largely of transparent material so that it will be scarcely noticeable by the insect to be trapped.

Still another object of my invention is to so design the trap that the insects imprisoned therein may be exterminated by plunging the body of the trap into water or by introducing a suitable substance, such as a gas, into the trap. The invention consists of a receptacle of uniform transparency which may be placed over an insect and a shutter which will close the opening under resilient tension when the latch is released.

These and other objects and advantages will be apparent from the following description, to be read in conjunction with the accompanying drawing, in which Figure 1 is a perspective view of an insect trap embodying my invention, a portion of the handle being broken away, Figure 2 a sectional view, taken on the center line of the device shown in Figure 1 but with a greater portion of the handle broken away, and Figure 3 a sectional plan view, as indicated by the line 3—3 on Figure 2.

Briefly, the invention resides in the production of a device having a suitable open ended receptacle, preferably of transparent material, which may be placed over the insect; a closure movable across the interior of the receptacle for trapping the insect therein; suitable means for moving the closure; and, when desired, means for introducing a poisonous substance, such as gas, into the receptacle for killing the insects therein.

Referring now more in detail to the drawing, the device is provided with a receptacle 5 which is preferably made of a transparent material, such as glass, and which has a socket 6 formed or secured on one of its ends and adapted to receive a handle 7. Receptacle 5 may be of any desired shape but has been shown as having a substantially square open end 8, a narrow closed end 9 opposite end 8, tapered side walls 10 and sloping side walls 11 and 12.

The lower edge of side wall 12 is set back a short distance from the free edges of side walls 10 and 11, which are in the same plane, in order to form a notch 13 through which a flexible closure 14 may be drawn by means of a flexible connector 15 which has been shown as being a heavy cord having one end secured to a spring 16 and its other end bifurcated and passing through small apertures 17 formed close to the corners of side wall 11 so that the bifurcated ends may cross open end 8 adjacent side walls 10 and have their ends secured near the corners of closure 14. The other end of spring 16 is secured to handle 7 at such a distance from receptacle 5 that the spring tends to yieldingly hold closure 14 in closed position. A flexible connector 18 has one end secured to the opposite end of closure 14 and its other end connected to a slide 19 encircling handle 7 and provided with a finger grip 20 and a tongue 21 which is slidable in a groove 22 formed in handle 7 and prevents slide 19 from rotating.

Closure 14 may be withdrawn from over open end 8, against the action of spring 16, by pulling on finger grip 20 until slide 19 is in its uppermost position where it may be held, if desired, by a catch 23 which has one end secured to handle 7 and its other end 24 disposed thereabove so that slide 19 may be released by depressing end 24 and forcing the body of the catch into a recess 25 formed in handle 7. Connectors 15 and 18 are preferably held parallel to side walls 11 and 12, respectively, and to handle 7 by passing them through suitable guides 26 formed or secured on or near socket 6.

If it is desired to provide the trap with means for poisoning or asphyxiating the insects trapped therein, handle 7 is made of tubular material or provided with a central bore 27 which registers with an aperture 28 extending through end 9 in alignment with the center of socket 6. The other end of handle 7 is counterbored and threaded so that a bulb 29 may be threaded therein.

In using the trap, slide 19 is moved upwardly on handle 7 until it is held by catch 23, at which time, closure 14 will be nearly fully withdrawn from over open end 8. Receptacle 5 is then placed over a fly, spider, or any other insect which may be resting on a relatively flat surface, and end 24 depressed so that spring 16 may move closure 14 across open end 8 and trap the insect within the receptacle. In case the insect being trapped is a small spider which is able to flatten itself against the surface, receptacle 5 may be slid on the surface to dislodge it before slide 19 is released. In approaching the insect, the trap will be scarcely noticed by it as receptacle 5 is transparent and closure 14 is preferably made of a transparent or translucent, colorless material, such as celluloid, while the bifurcated ends of connector 15 are disposed close to side walls 10.

After the insect has been trapped, receptacle 5 may be plunged into water and the insect drowned or it may be released out of doors or otherwise disposed of. If it is desired to trap a number of insects before disposing of them, a portion of the interior of receptacle 5 may be painted with a colorless adhesive substance with which the insects will come in contact after they are trapped in the receptacle. Instead of providing side wall 12 with notch 13, this side wall may be provided with a slot disposed farther from the edge of the side wall and closure 14 passed therethrough and adapted to be drawn against wall 11 by connector 15 which, in this case, extends through apertures 17 disposed farther from the edge of side wall 11. With a trap made in this manner, and after trapping one or more insects, the receptacle would be placed over the insect to be trapped before closure 14 is withdrawn. The withdrawing of the closure would disturb the insect so that it would fall or fly into the interior of receptacle 5 and be trapped therein by allowing spring 16 to draw the closure into place.

After one or more insects are trapped in receptacle 5 and it is inconvenient or objectionable to the person using the trap to dispose of the insects otherwise, they may be exterminated by the use of a gas which has previously been placed in bulb 29. When an insect is so disposed that it would be difficult to trap it by use of the closure, as where a centipede or spider is on the floor, the trap may be placed over it and bulb 29 pressed in order to poison or asphyxiate it.

The device as illustrated may be modified or changed in various ways without departing from the invention herein set forth and hereinafter claimed.

I claim:—

1. An insect trap including a receptacle having surfaces of uninterrupted transparency and an open end adapted to be positioned against a surface, a handle on the receptacle, a flexible closure for closing the open end of the receptacle, and means operable from the handle for moving the closure.

2. An insect trap including a receptacle having an open end, a handle on the receptacle, a closure movable across the interior of the receptacle for blocking the open end, flexible means connected to one edge of the closure and passing through one side of the receptacle, flexible means connected to the opposite edge of the closure, and means on the handle for operating the flexible means.

3. An insect trap including a receptacle having an open end, a handle on the receptacle, a closure movable across the interior of the receptacle for blocking the open end, a flexible connector secured to one edge of the closure, a spring connected to the connector and to the handle and tending to hold the closure in closed position, and means for moving the closure against the action of the spring.

4. An insect trap including a receptacle having an open end, a handle on the receptacle, a closure movable across the interior of the receptacle for blocking the open end, a flexible connector secured to one edge of the closure, a spring connected to the connector and to the handle and tending to hold the closure in closed position, a slide on the handle, a connector attached to the closure and to the slide, and a catch for holding the slide against the action of the spring.

5. An insect trap including a receptacle having an open end and an aperture, a tubular handle secured to the receptacle and registering with the aperture, means for closing the open end of the receptacle, and means for introducing a poisonous substance into the receptacle through the handle.

6. An insect trap including a receptacle having an open end and an aperture, a tubular handle secured to the receptacle and registering with the aperture, means for closing the open end of the receptacle, and a collapsible bulb attached to the end of the handle and communicating with its interior.

In testimony whereof I have signed my name to this specification.

JAMES LAMBERT DISNEY.